(12) United States Patent
Saint-Laurent et al.

(10) Patent No.: US 7,911,239 B2
(45) Date of Patent: Mar. 22, 2011

(54) GLITCH-FREE CLOCK SIGNAL MULTIPLEXER CIRCUIT AND METHOD OF OPERATION

(75) Inventors: Martin Saint-Laurent, Austin, TX (US); Yan Zhang, Cary, NC (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 11/453,733

(22) Filed: Jun. 14, 2006

(65) Prior Publication Data

US 2007/0290725 A1    Dec. 20, 2007

(51) Int. Cl.
H03K 17/00 (2006.01)
G06F 1/04 (2006.01)

(52) U.S. Cl. .......................... 327/99; 327/298
(58) Field of Classification Search .............. 327/99, 327/298, 407–410
See application file for complete search history.

(56) References Cited

U.S. PATENT DOCUMENTS

| | | | |
|---|---|---|---|
| 4,853,653 A | 8/1989 | Maher | |
| 5,623,223 A * | 4/1997 | Pasqualini | 327/298 |
| 5,652,536 A * | 7/1997 | Nookala et al. | 327/298 |
| 5,877,636 A * | 3/1999 | Truong et al. | 327/99 |
| 6,362,680 B1 | 3/2002 | Barnes | |
| 6,452,426 B1 * | 9/2002 | Tamarapalli et al. | 327/99 |
| 6,587,954 B1 | 7/2003 | Chiu | |
| 6,639,449 B1 | 10/2003 | De La Cruz et al. | |
| 6,960,942 B2 | 11/2005 | Ghaderi et al. | |
| 7,446,588 B2 * | 11/2008 | Boerstler et al. | 327/298 |
| 2003/0184347 A1 | 10/2003 | Haroun et al. | |
| 2004/0263217 A1 | 12/2004 | Hutson et al. | |
| 2005/0017763 A1 | 1/2005 | Slobodnik et al. | |
| 2005/0270073 A1 | 12/2005 | Lee et al. | |
| 2007/0257710 A1 * | 11/2007 | Mari et al. | 327/99 |
| 2008/0094108 A1 * | 4/2008 | Leon | 327/99 |

FOREIGN PATENT DOCUMENTS

| | | |
|---|---|---|
| RU | 2154346 C2 | 8/2000 |
| RU | 2158489 | 10/2000 |
| TW | I237946 | 8/2005 |
| TW | I243980 | 11/2005 |

OTHER PUBLICATIONS

International Search Report and Written Opinion-PCT/US2007/071147 - International Search Authority, European Patent Office, Jan. 17, 2008.
Taiwanese Search report - 096121496 - TIPO - Jun. 17, 2010.

* cited by examiner

*Primary Examiner* — Lincoln Donovan
*Assistant Examiner* — Patrick O'Neill
(74) *Attorney, Agent, or Firm* — Peter M. Kamarchik; Nicholas J. Pauley; Jonathan T. Velasco

(57) ABSTRACT

Techniques for the design and use of a digital signal processor, including for processing transmissions in a communications system. Reduced glitch occurs in switching from a first clock input to a second clock input driving a clock multiplexer. The clock multiplexer receives a first clock input and provides a clock output and determines a low phase output level in the clock output. For a limited period of time, a low phase output level is forced. The clock multiplexer receives a second clock input and determines a low phase input level in the second clock input signal. Switching to providing the clock output in response to the second clock input occurs during the low phase input level in the second clock input signal. Then, the output of the clock multiplexer follows the phase level of the second clock signal.

27 Claims, 7 Drawing Sheets

US 7,911,239 B2

GLITCH-FREE CLOCK SIGNAL MULTIPLEXER CIRCUIT AND METHOD OF OPERATION

FIELD

The disclosed subject matter relates to digital circuitry, such as digital circuitry for digital signal processing, wireless communications and other applications. More particularly, this disclosure relates to a novel and improved glitch-free clock signal multiplexer circuit such as may be useful for many types of digital circuits.

DESCRIPTION OF THE RELATED ART

The use of code division multiple access (CDMA) techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," and U.S. Pat. No. 5,103,459, entitled "SYSTEM AND METHOD FOR GENERATING WAVEFORMS IN A CDMA CELLULAR TELEHANDSET SYSTEM," both assigned to the assignee of the claimed subject matter. A CDMA system is typically designed to conform to one or more standards. One such standard is offered by a consortium named the "3rd Generation Partnership Project" (3GPP) and embodied in a set of documents including Document Nos. 3G TS 25.211, 3G TS 25.212, 3G TS 25.213, and 3G TS 25.214, which are readily available to the public. The 3GPP standard is hereinafter referred to as the W-CDMA Standard.

In a further enhancement, W-CDMA broadband technology, one particular type of chipset for WCDMA handsets is known as the Mobile Station Modem™ (MSM chipset™) line of chipsets. The MSM chipset line of chipsets is offered by the present assignee of the disclosed subject matter and, at least some of such chipsets use 65 nm CMOS technology and interface to RF CMOS single-chip transceiver and multi-band receiver devices, to provide great cost-efficiency. The MSM chipset line of chipsets, for example support EDGE, GPRS and GSM networks, and provide multimedia capabilities integrated into camera and image processing, video streaming, playback, recording and video telephony; streaming and playback of popular audio codecs such as MP3, AAC/aacPlus™ and Enhanced aacPlus; Bluetooth® connectivity; 2D/3D graphics; as well as OMA 2.0-compliant digital rights management (DRM). Moreover, some MSM chipset provide interoperability between single-chip Radio-on-Chip for Mobile™ (ROCm) solutions, giving them the ability to support 802.11g and 802.11a/g wireless LAN (WLAN) technology.

MSM chipset and similar chipsets oftentimes use multiple clocks that feed multiple subsystems. These clocks are generally asynchronous to each other, because to operate properly the various subsystems require different clocks at different times. With more and more multi-frequency clocks being used in these and similar chipsets, especially in the communications field, it is often necessary to switch the source of a clock line while the chip is running. This is usually implemented by multiplexing two or more different frequency clock sources in hardware and controlling the multiplexer select line by internal logic. The two clock frequencies could be totally unrelated to each other or they may be multiples of each other. In either case, there is a chance of generating an undesirable glitch on the clock line at the time of the switch. A glitch on the clock line is hazardous to the whole system, as it could be interpreted as a capture clock edge by some registers while missed by others or provide too little time for the computations in programs to finish.

One approach to address this problem is to provide a circuit for selecting and switching from one to another of a plurality of clock sources having different frequencies without generating runt pulses, electrical glitches, metastable conditions, or other anomalies is described in U.S. Pat. No. 4,853,653. In such a solution, a multiple input clock selector is provided for switching asynchronously from one to another of a plurality of oscillators that generate clock signals having different frequencies. The clock selector has a plurality of sections corresponding to the plurality of oscillators. Each section of the clock selector comprises an initial AND gate, a pair of flip-flops, and a final AND gate all connected in series. The oscillator signal for each section is applied to the final AND gate and to the flip-flops as a clock input. An inverted signal from the second flip-flop of each section is fed back as an input to the initial AND gates of all the other sections. An oscillator select signal is also provided as an input to the initial AND gate of each section. The outputs of all final AND gates pass through an OR gate that provides the selected clock output. The clock selector switches between oscillators as determined by the select signals without producing runt pulses, metastable conditions, or other anomalous signals. However, this solution requires that the select lines remain stable until the switching operation is complete, otherwise the circuit may produce glitches.

Another approach uses a "phase switch multiplexer." The phase switch multiplexer, unfortunately, demonstrates the undesirable behavior of compressing some clock phases. It is also subject to metastability. Metastability exists when the storage node of a sequential element goes to a state between an ideal "one" and an ideal "zero." A metastable state can be interpreted differently by the clock multiplexer and the enable feedback of the other flip flop. Therefore, it is required that capturing edges of both flip flops and the launch edge of the SELECT signal should be set apart from each other to avoid any asynchronous interfacing.

Accordingly, there is the need for a solution to the problem of switching between clocks in a glitch-free and phase-compression-free manner.

There is a need for fast switching time and simplicity in clock switching circuits that may be used for mobile system chipsets and similar applications.

There is a further need for a clock signal switching circuit that provides a low probability of metastability or other anomalies during the switching process.

SUMMARY

Techniques for providing a novel and improved glitch-free clock signal multiplexer circuit are disclosed, which techniques improve both the operation of a digital signal processing chipsets for increasingly powerful software applications including applications operating in personal computers, personal digital assistants, wireless handsets, and similar electronic devices, as well as increasing the associated digital processing speed, energy use and service quality.

According to one aspect of the disclosed subject matter, there is provided a method and system that prevent glitches in clock signal switching from a first clock input driving a clock multiplexer circuit to a second clock input driving the clock multiplexer. The method and system provide for receiving a first clock input signal in a clock multiplexer circuit and providing a clock signal output from the clock multiplexer circuit in response to the clock multiplexer circuit receiving the first clock input signal. The disclosed subject matter determines a low phase output level in the clock signal output in response to a low phase input level in the first clock signal output and forces, for a limited period of time, the clock multiplexer circuit to maintain the low phase output level irrespective of the phase level of the first clock input signal. The clock multiplexer circuit also receives a second clock input signal and determines the presence of a low phase input level in the second clock input signal. Switching from providing the clock signal output in response to the first clock input signal to providing the clock signal output in response to the second clock input signal occurs while maintaining the low phase output level and during the low phase input level in the second clock input signal. Then, method and system allow the output of the clock multiplexer circuit to follow the phase level of the second clock signal input after the switching step.

These and other advantages of the disclosed subject matter, as well as additional novel features, will be apparent from the description provided herein. The intent of this summary is not to be a comprehensive description of the claimed subject matter, but rather to provide a short overview of some of the subject matter's functionality. Other systems, methods, features and advantages here provided will become apparent to one with skill in the art upon examination of the following FIGUREs and detailed description. It is intended that all such additional systems, methods, features and advantages be included within this description, be within the scope of the accompanying claims.

BRIEF DESCRIPTIONS OF THE DRAWINGS

The features, nature, and advantages of the disclosed subject matter will become more apparent from the detailed description set forth below when taken in conjunction with the drawings in which like reference characters identify correspondingly throughout and wherein:

FIG. 1 is a simplified block diagram of a mobile station modem system that may implement the disclosed subject matter;

FIG. 2 demonstrates the concept of clock circuit glitch as addressed by the disclosed subject matter;

Figure 7:
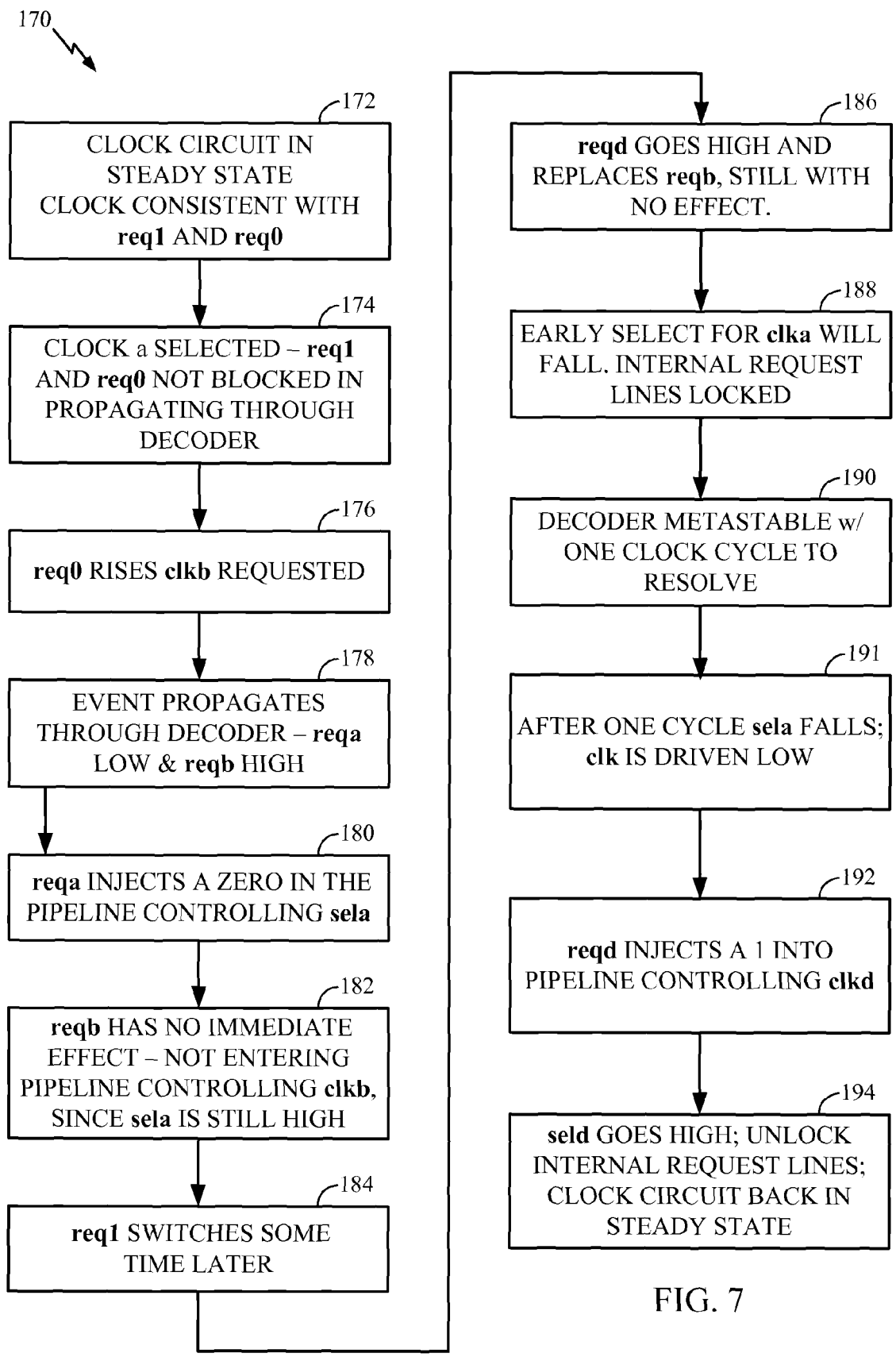
Figure 8:
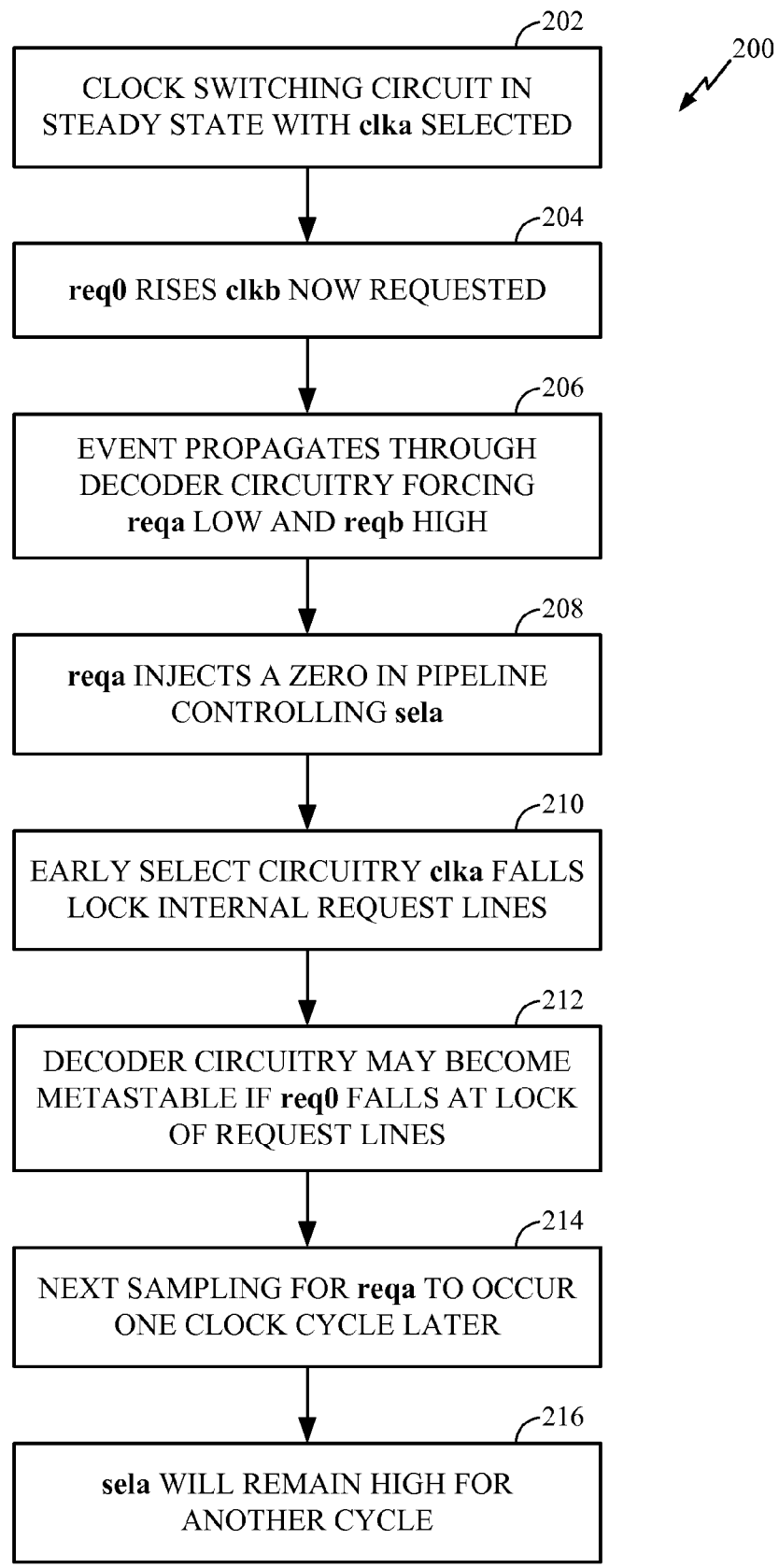
Figure 9:
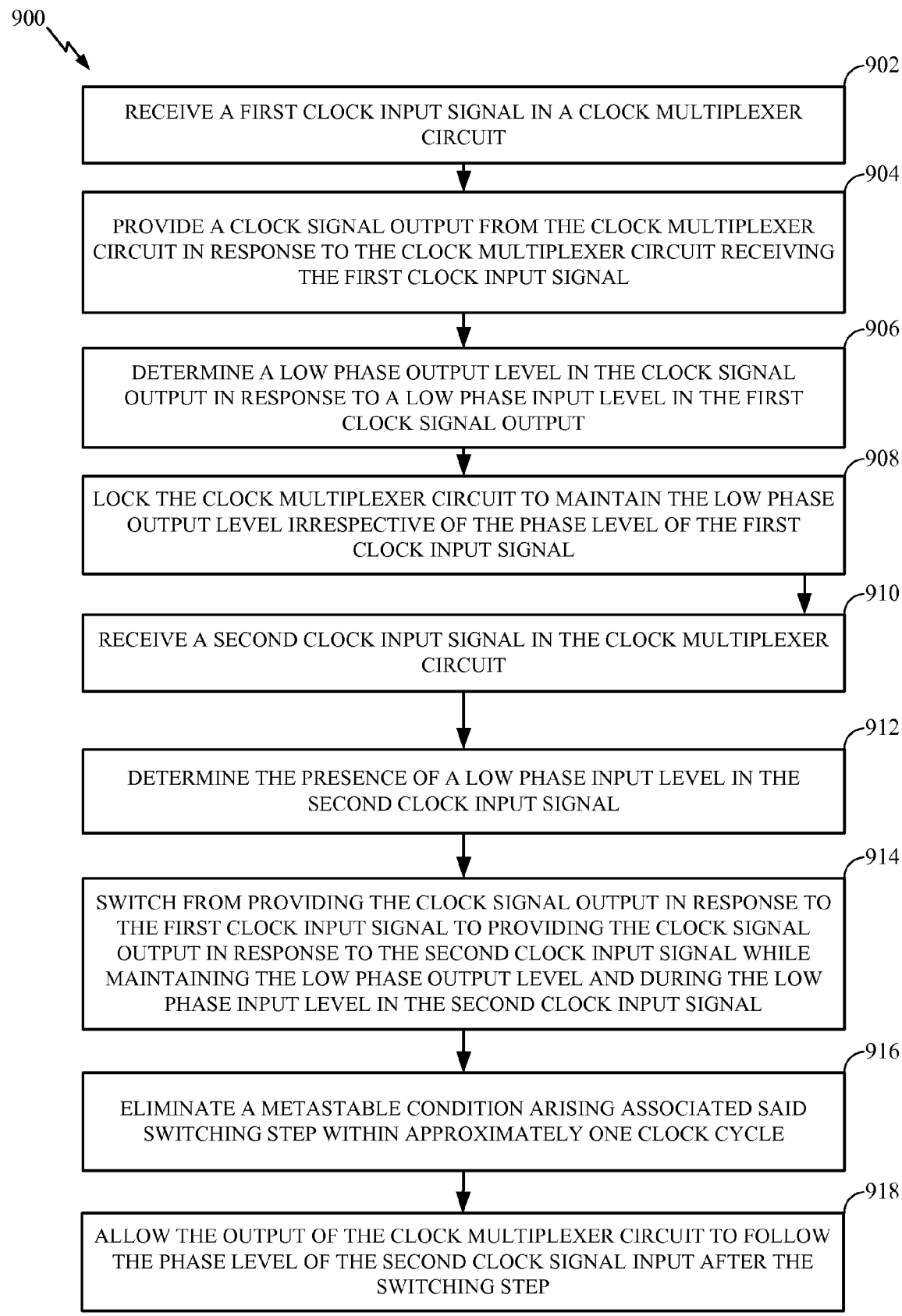

FIG. 7 provides a functional flow chart depicting specific steps of the present disclosure;

FIG. 8 is a flow chart for the metastability correction aspects of the disclosed subject matter; and FIG. 9 is a flow chart illustrating aspects of the disclosed subject matter.

DETAILED DESCRIPTION OF THE SPECIFIC EMBODIMENTS

The disclosed subject matter for a novel and improved glitch-free clock signal multiplexer circuit may find use for signal processing applications of any type for which the benefits here presented may be advantageous. One such application appears in telecommunications and, in particular, in wireless handsets that employ one or more digital signal processing circuits.

Figure 1:
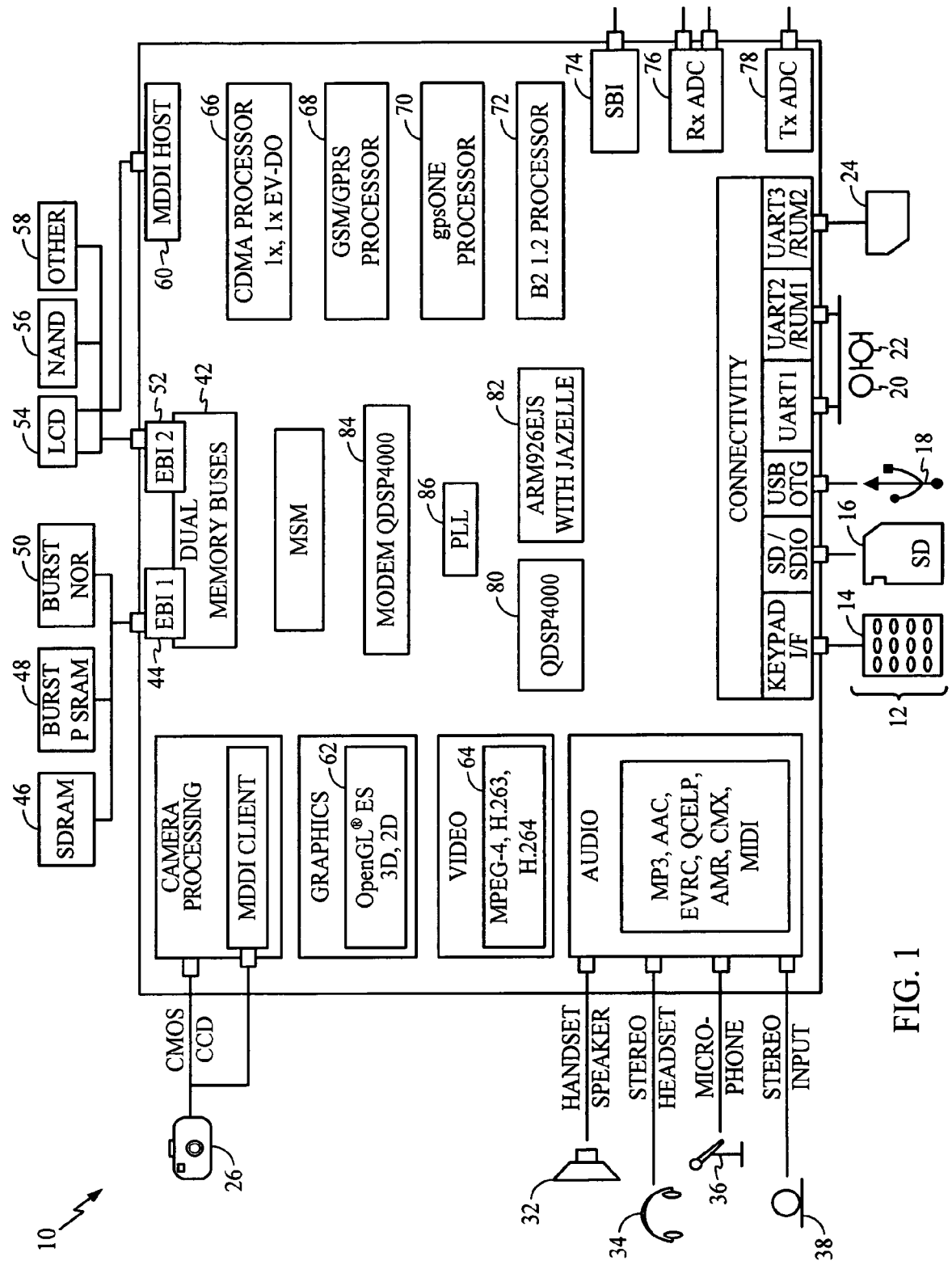

FIG. 1 is a simplified block diagram of a mobile station modem (MSM) chipset 10 that may implement the disclosed subject matter. Understand, however, that the presently disclosed subject matter may be applied to many different types of chipsets operating in many different environments. The presentation here made, therefore, provides a demonstration of one such use. In particular, FIG. 1 shows MSM chipset 10 in which the presently disclosed subject matter may find advantageous application. MSM chipset 10 includes connectivity applications 12, such as keypad interface 14, SD/SDIO application 16, USB OTG connection 18, and universal asynchronous receive and transmit (UART) devices such as UART1 20, UART2/receive unit interface modem (RU IM1) 22, and UART3/RU IM2) 24. Video input to MSM chipset 10 may come through CMOS CCD camera input 26 to camera processing circuitry 28 and MODI client 30, while audio interfaces include handset speaker 32, stereo headset 34, microphone 36, and stereo input 38 for interfacing audio circuitry 40. Audio circuitry 40 may be capable of supporting applications such as MP3, AAC/aacPlus functions, EVRC, QCELP, EVRC, QCELP, AMR, CMX, and MIDI applications.

In the MSM chipset 10 example of FIG. 1, dual memory busses 42 interface various memory and related functional circuits. These may include EB1 44 for interfacing memory devices such as SDRAM 46, Burst P SRAM 48, and Burst NOR 50, and EB2 52 for interfacing LCD 54, NAND 56, and other devices 58. Also, MDDI (mobile display digital interface) Host 60 may provide an interface with LCD 54. MSM chipset 10 may also include graphics circuitry 62 for supporting OpenGL® ES, 3D, and 2D functions and video circuitry 64 for supporting MPEG-4, H.263 and H.264 functions. In addition, processing functions, such as those of CDMA processor 66, GSM/GPRS processor 68, gpsOne processor 70, and BT 1.2 processor 72 may be included in MSM chipset 10. Providing signal conversion processes and the like, MSM chipset 10 may include serial bus interface (SBI) 74, receive A/D converter (Rx ADC) 76, and transmit D/A converter (Tx DAC) 78.

MSM chipset 10 may further include various chipset processors, such as Qualcomm Inc.'s QDSP 4000 processor 80, Arm, Inc.'s ARM 926EJS processor 82, and Qualcomm, Inc.'s Modem QDSP 4000 86, as well as one or more phase lock loop (PLL) circuits 86. PLLs 86 assist with the generation of a clock signal. Essentially any portion of MSM chipset 10 that needs a clock signal for digital circuit operation may draw upon PLLs 86 for such clock signals. In addition, there may be many PLLs 86, e.g., six or more, operating in different embodiments of MSM chipset 10.

At times it is possible to have one PLL 86 provide a clock to two or more portions of MSM chipset 10. This is advantageous from a power use standpoint in that the same PLL 86 may provide a clock signal to two or more portions of MSM chipset 10, e.g., to CDMA processor 66, GSM/GPRS processor 68, and gpsOne processor 70. With PLLs 86 providing multi-frequency clocks to the various components of MSM chipset 10, it is often necessary to switch the source of a clock line while the respective component is running. Control of which PLL 86 may provide the desired clock signal is the focus of the present disclosure, with one embodiment appearing below in FIGS. 5 through 8.

The disclosed subject matter provides for multiplexing two different frequency clock sources in hardware and controlling the multiplexer select line by internal logic. The two clock frequencies could be totally unrelated to each other, may have some arbitrary relationship to one another, or they may be multiples of each other. In either case, the present disclosure avoids generating a glitch on the clock line at the time of the switch. A glitch on the clock line is hazardous to all of MSM chipset 10, as it could be interpreted as a capture clock edge by some registers while missed by others or provide to little time for the computations in programs to finish.

Figure 2:
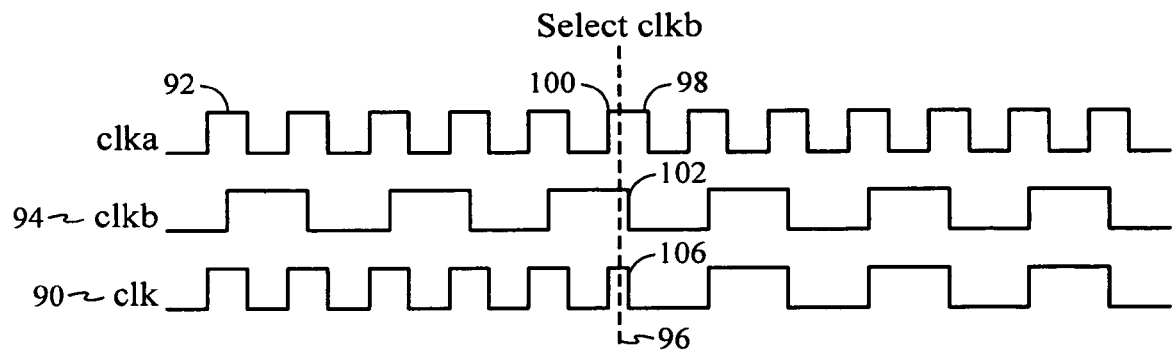

FIG. 2 illustrates more specifically what is here to be understood as "glitch" within a clock circuit. The clk signal 90 depicts the presence of glitch 106 in switching from clka signal 92 to clkb signal 94. A clock signal multiplexer may respond to a select signal (at the time indicated by line 96) for switching from clka to clkb signal 94 less than a complete clka phase duration 98 after clka rising edge 100 and before for a clkb falling edge 102 of clkb phase duration 104. In such instance, clk signal 90 demonstrates a glitch 106 where the high phase of the output clock is compressed. Such a condition may, for example, adversely affect the entire operation of MSM chipset 10.

In contrast, a multiplexer designed specifically for multiplexing clock signals. The select lines are allowed to switch asynchronously. The clock circuit ensures that output clock 90 never glitches (i.e., its high or low phase does not get compressed). The disclosed subject matter provides such a clock switching circuit.

Setup and hold time violations can lead to metastability, which may exist for an undetermined amount of time. Theoretically, therefore, the time required to resolve the state of the latch may then be infinite. There will always be points in the continuous domain which are equidistant (or nearly so) from the points of the discrete domain, making a decision as to which discrete point to select a difficult and potentially lengthy process. If the inputs to an arbiter or flip-flop arrive almost simultaneously, the circuit most likely will traverse a point of metastability. The disclosed subject matter, as will be shown below, addresses this problem in providing the desired glitch-free clock signal switching.

Figure 3:
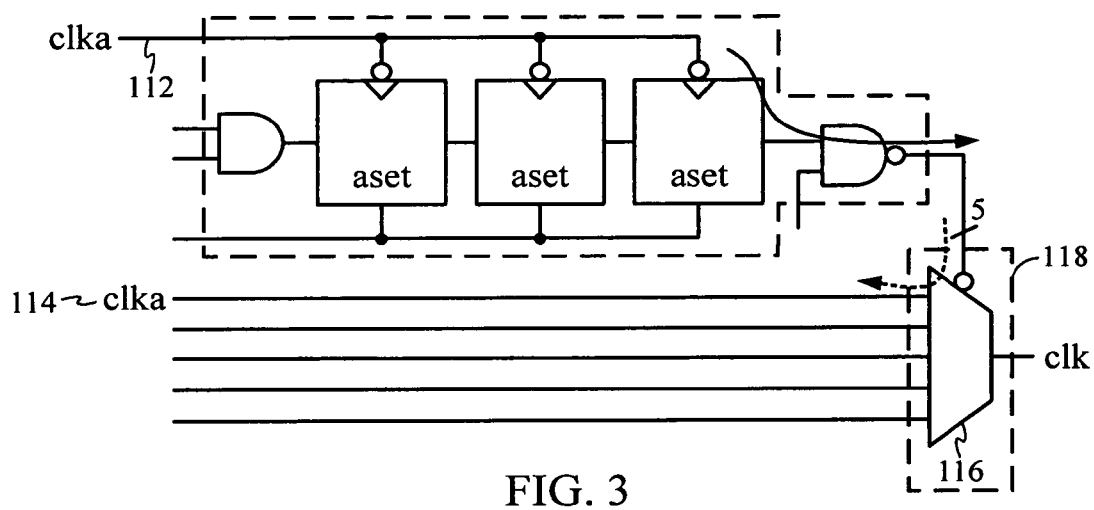
FIG. 3 illustrates aspects of a clock control pipeline relevant to the present disclosure.

In FIG. 3, clka line 112 provides clka signal 92 into clock control pipeline (CCP) 114. CCP 114 may be one of a number of CCPs that control inputs into multiplexer circuit 116. That is, clka signal 112 is one of, for example five (5) possible clock signal inputs from which multiplexer circuit 116 may generate output clock signal 118.

Figure 4:
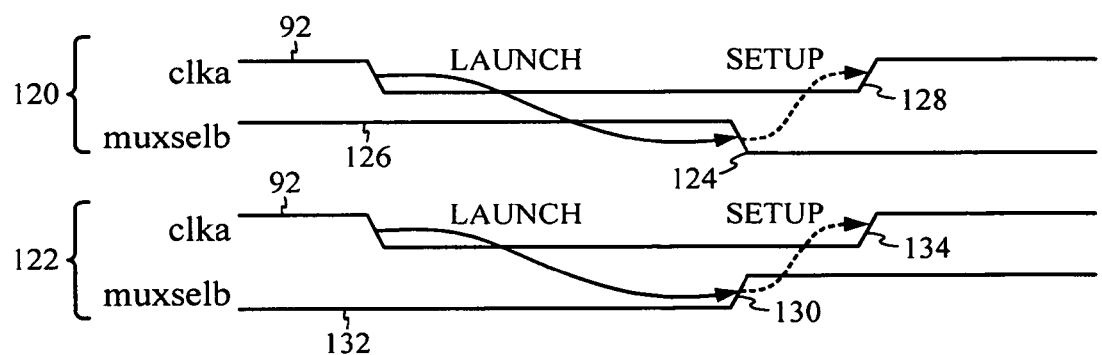
FIG. 4 illustrates aspects of a phase path as appropriate for the present disclosure.

FIG. 4 shows aspects of clock signal timing applicable to CCP 114 for demonstrating graphically the problem of glitch in a digital circuit. The CCP 114 critical timing path appears as switching examples 120 and 122. In phase path 120, falling edge 124 of multiplexer select (active low) signal 126 must be stable before rising edge 128 of clka clock signal 92 to allow its undistorted propagation through multiplexer 116. A late falling edge 124 will chop the high-phase of the clka clock signal 92. Likewise, rising edge 130 of multiplexer select 132 must also be stable before rising edge 134 of clka clock signal 92 to prevent a glitch at clk output 118 of multiplexer 116.

Figure 5:
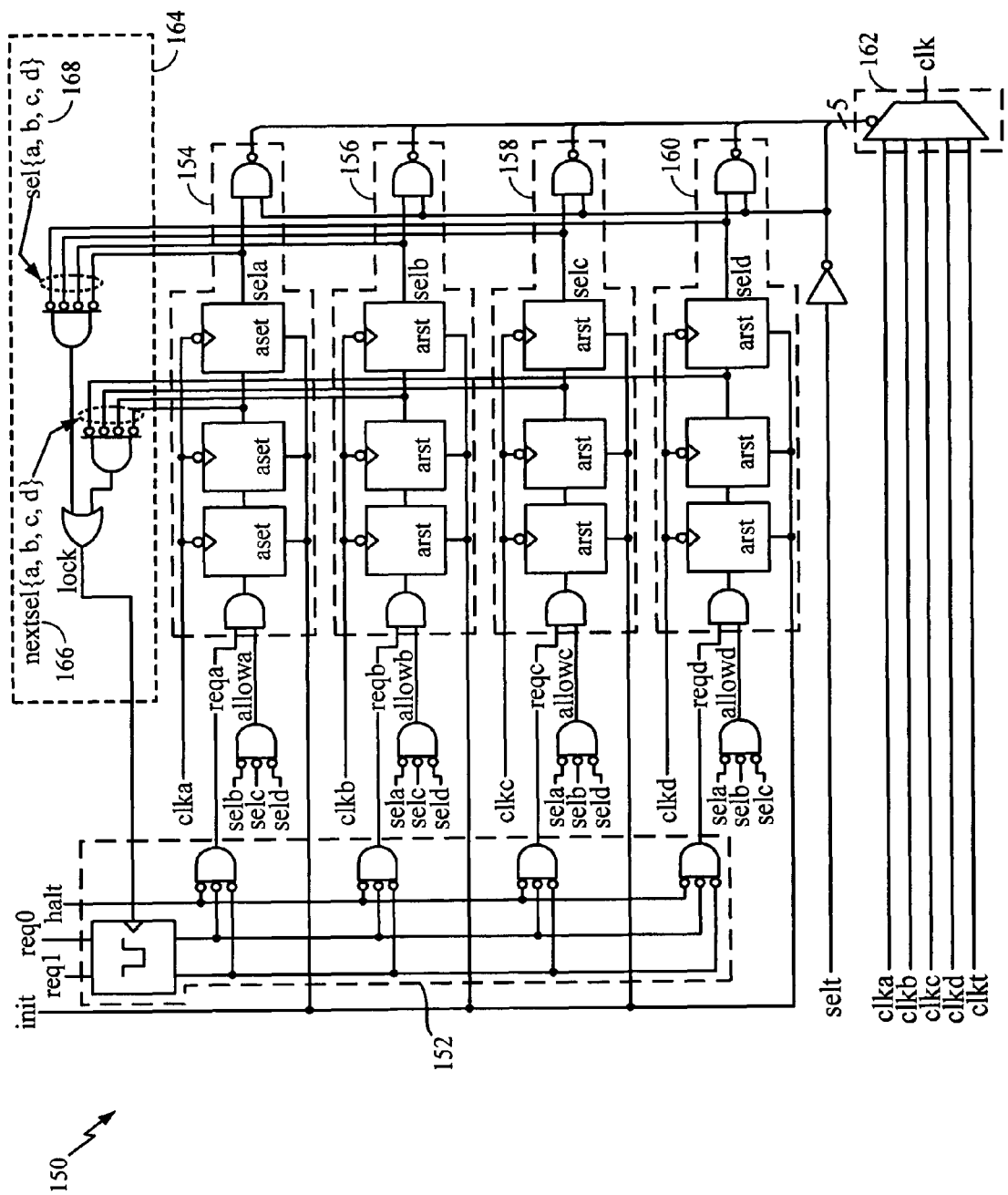
FIGS. 5 and 6 shows a clock switching circuit embodying aspects of the disclosed subject matter.

FIG. 5 illustrates clock switching circuit 150 in which the present disclosure may be advantageously employed. Clock switching circuit 150 includes decoder circuitry 152 for receiving init, req1, req0, and halt inputs. Select control signals are fed to clock control pipeline 154 for the clka signal, clock control pipeline 156 for the clkb signal, clock control pipeline 158 for the clkc signal, and clock control pipeline 160 for the clkd signal. The 5-to-1 multiplexer circuit 162 receives clock signals, clka, clkb, clkc, clkd, and clkt (test clock). In addition and of particular importance to the disclosed subject matter, clock switching circuit 150 provides locking circuitry 164 for locking the internal request lines reqa, reqb, reqc, reqd and, thereby, preventing glitch.

Figure 6:
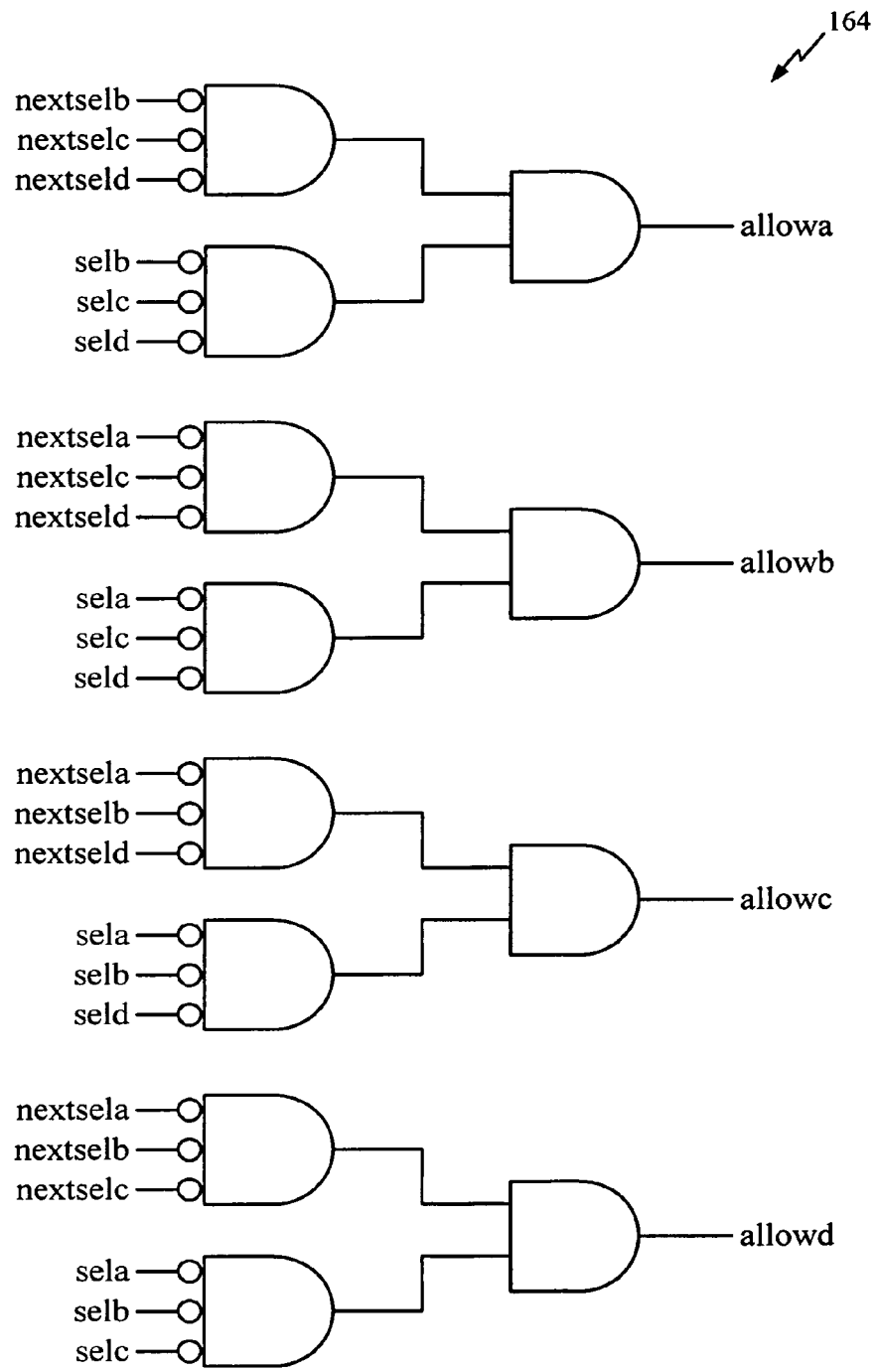

Locking circuitry 164 further includes early select lines 166 and late select lines 168. FIG. 6, shows with more specificity one embodiment of the inputs for the clock control pipelines 154 through 160 that may be employed to achieve the objects of the present disclosure.

Clock switching circuit 150 provides control logic for switching from one clock to another that includes waiting for a low phase level of the current clock. When no selects into multiplexer circuitry 162 are active, the output is low. Clock switching circuit 150 forces the output of multiplexer circuitry 162 low and waits for the low phase of the new clock signal. Then, clock circuitry 150 allows multiplexer circuitry 162 to follow the high and low phase levels of the new clock.

In clock switching circuit 150, select lines (sela, selb, selb, and seld) may switch asynchronously to clka, clkb, clkc, and clkd, while fully avoiding output clock glitches. The disclosed embodiment of clock switching circuit 150 supports four (4) CCPs including pipelines 154 through 160. Clock switching circuit 150 merges logic of CCP 114 with that of a multiplexer 162 to reduce the number of stages in the PLL clock path. A technical advantage of the disclosed embodiment is significant improvement in both jitter and duty cycle distortion. In addition, clock switching circuit 150 allows the CCP logic to be disabled when not needed. Additional technical advantages of the disclosed subject matter include clock switching support for a 1.0-GHz clock in one embodiment. The present disclosure demonstrates a low probability of metastability, low jitter, low duty cycle distortion, low power and energy requirements, low area requirements and low skew.

FIG. 7 provides a functional flow chart 170 depicting specific steps of the present disclosure, as may be performed by clock switching circuit 150. In further explaining a switching process between clocks, consider clocking switching circuit 150 to be in steady state when the clock currently selected is consistent with the external request lines req1 and req0 (step 172). That is, assume that clock switching circuit 150 is in steady state with clka selected (step 174). The external request lines are not blocked from propagating through the decoder. Then, req0 may rise and clkb is then requested (step 176). The event propagates through decoder circuitry 152, forcing reqa low and reqb high (step 178). Then, reqa injects a zero in the pipeline controlling sela 154 (step 180). However, reqb has no immediate effect. In operation, reqb is not yet allowed to enter the pipeline controlling clkb, since sela is still high (step 182).

Some time later req1 may switch (Step 184). Then, reqd now goes high and replaces reqb, still with no immediate effect on the multiplexer 162 output clock signal (step 186). At some point, the early select for clka will fall. This will lock the internal request lines feeding pipelines 152 through 160 (step 188). Then, decoder circuitry 152 may become metastable. Within one clock cycle, the disclosed circuit substantially reduces the probability that metastability occurs (step 190). After one cycle, sela will fall as well. At this point in time, none of the select lines sela, selb, selc or seld are active, thereby causing clock switching circuit 150 to drive the output of the multiplexer circuitry 162, clk, low (step 191). Now, reqd is allowed to inject a one into the pipeline controlling clkd 160 (step 192). Eventually, seld will go high, which will unlock the internal request lines and place clock switching circuit 150 back in steady state (step 194).

As flowchart 200 of FIG. 8 details, clock switching circuit 150 also effectively addresses decoder circuitry 152 metastability. Beginning at step 202, assume that clock switching circuit 150 is in steady state with clka selected (step 202). The external request lines are not blocked from propagating through the decoder. Assume that req0 rises and that clkb is now being requested (step 204). The event propagates through decoder circuitry 152, forcing reqa low and reqb high (step 206). Then, reqa injects a zero in the pipeline controlling sela 154 (step 208). At some point, the early select circuitry 166 for clka will fall. This will lock the internal request lines feeding pipelines 152 through 160 (step 210). Decoder circuitry 152 may become metastable, if req0 falls at the same time (step 212). Metastability on reqa can be tolerated because the next sampling event for it will occur only one clock cycle later (step 214). Metastability on reqb, reqc, and reqd can also be tolerated since sela, the late select for clka, will remain high for another cycle (step 216).

In the disclosed embodiment, a test mode of operation may also be provided for selecting the test clock. Selecting the test clock, clkt, bypasses the functional clock normally produced by 5-to-1 multiplexer circuitry 162. Selecting the clkt does not impact the state of clock switching circuit 150 in controlling the operation of multiplexer circuitry 162. Selecting the clkt does not impact clock switching circuit 150. The test clock select line overrides clock switching circuit 150.

FIG. 9 depicts a particular embodiment of a method 900 that includes receiving a first clock input signal in a clock multiplexer circuit, at 902, and providing a clock signal output from the clock multiplexer circuit in response to the clock multiplexer circuit receiving the first clock input signal, at 904. The method 900 includes determining a low phase output level in the clock signal output in response to a low phase input level in the first clock signal output, at 906, and locking the clock multiplexer circuit to maintain the low phase output level irrespective of the phase level of the first clock input signal, at 908. The method 900 includes receiving a second clock input signal in the clock multiplexer circuit, at 910, and determining the presence of a low phase input level in the second clock input signal, at 912. The method 900 also includes switching from providing the clock signal output in response to the first clock input signal to providing the clock signal output in response to the second clock input signal while maintaining the low phase output level and during the low phase input level in said second clock input signal, at 914. The method 900 includes eliminating a metastable condition arising in association with the switching step within approximately one clock cycle, at 916, and allowing the output of the clock multiplexer circuit to follow the phase level of the second clock signal input after the switching step, at 918.

In summary, the present disclosure provides a method and system that prevent glitches in clock signal switching from a first clock input driving a clock multiplexer circuit to a second clock input driving the clock multiplexer. The method and system provide for receiving a first clock input signal in a clock multiplexer circuit and providing a clock signal output from the clock multiplexer circuit in response to the clock multiplexer circuit receiving the first clock input signal. The disclosed subject matter determines a low phase output level in the clock signal output in response to a low phase input level in the first clock signal output and forces, for a limited period of time, the clock multiplexer circuit to maintain the low phase output level irrespective of the phase level of the first clock input signal. The clock multiplexer circuit also receives a second clock input signal and determines the presence of a low phase input level in the second clock input signal. Switching from providing the clock signal output in response to the first clock input signal to providing the clock signal output in response to the second clock input signal occurs while maintaining the low phase output level and during the low phase input level in the second clock input signal. Then, method and system allow the output of the clock multiplexer circuit to follow the phase level of the second clock signal input after the switching step.

The processing features and functions described herein for reducing glitch in switching from a first clock signal input driving a clock multiplexer circuit to a second clock input driving said clock multiplexer circuit may be implemented in various manners. Moreover, the process and features here described may be stored in magnetic, optical, or other recording media for reading and execution by such various signal and instruction processing systems. The foregoing description of the preferred embodiments, therefore, is provided to enable any person skilled in the art to make or use the claimed subject matter. Various modifications to these embodiments will be readily apparent to those skilled in the art, for example, one further embodiment may include an N-to-1 version of the circuit, and the generic principles defined herein may be applied to other embodiments without the use of the innovative faculty. Thus, the claimed subject matter is not intended to be limited to the embodiments shown herein but is to be accorded the widest scope consistent with the principles and novel features disclosed herein.

What is claimed is:

1. A method comprising:
   receiving a first clock input signal of a plurality of clock input signals in a clock multiplexer circuit, each of the plurality of clock input signals associated with one or more of a plurality of clock select signals that indicates whether the associated clock input signal is selected;
   providing a clock signal output from said clock multiplexer circuit in response to said clock multiplexer circuit receiving said first clock input signal and a first clock select signal of the plurality of clock select signals configured to indicate a selection of the first clock input signal;
   determining a low phase output level in said clock signal output in response to a low phase input level in said first clock input signal;
   locking said clock multiplexer circuit to maintain said low phase output level irrespective of the phase level of said first clock input signal, wherein the locking of said clock multiplexer circuit is performed by locking a set of internal request lines of said clock multiplexer circuit in response to the first clock select signal of the plurality of clock select signals being configured not to indicate a selection of the associated clock input signal, wherein the set of internal request lines is used to facilitate transitions of the clock signal output from said clock multiplexer circuit between the plurality of clock input signals, and wherein said clock multiplexer circuit maintains said low phase output level at least so long as the set of internal request lines remain locked;
   receiving a second clock input signal of the plurality of clock input signals in said clock multiplexer circuit;
   determining the presence of a low phase input level in said second clock input signal;
   switching, if a second clock select signal of the plurality of clock select signals is configured to indicate a selection of the second clock input signal, from providing said clock signal output based on the locked low phase output level to providing said clock signal output in response to said second clock input signal while maintaining said low phase output level and while said low phase input level is present in said second clock input signal, wherein the switching step includes unlocking the set of internal request lines; and
   allowing said clock signal output of said clock multiplexer circuit to follow the phase level of said second clock signal input after said switching step.

2. The method of claim 1, further comprising the step of performing said locking step as an early stage locking step for a first part of said locking step and a later stage locking step for a later part of said locking step.

3. The method of claim 1, further comprising the step of testing the operation of said clock multiplexer circuit using circuitry at least a portion of which operates independently of said first clock signal input and said second clock signal input.

4. The method of claim 1, further comprising the step of associating said first clock signal input with said clock multiplexer circuit using a first clock control pipeline and said second clock signal input with said clock multiplexer circuit using a second clock control pipeline.

5. The method of claim 4, further comprising associating a decoder circuit with said first clock control pipeline and said second clock control pipeline.

6. The method of claim 1, further comprising the steps of deriving said first clock signal input from a first phase locked loop circuit and said second clock signal input from a second phase locked loop circuit.

7. The method of claim 1, further comprising the step of associating said output of said clock multiplexer circuit with a plurality of digital signal processing circuits.

8. The method of claim 1, further comprising the steps of associating said output of said clock multiplexer circuit with a mobile station modem chipset.

9. The method of claim 1, wherein internal request lines corresponding to external request values received at a decoder circuit are locked at least one clock cycle of the first or second clock input signals prior to a sampling event related to an output of the decoder circuit.

10. A glitch reducing clock switching circuit comprising:
a clock multiplexer circuit for receiving a first clock input signal of a plurality of clock input signals, each of the plurality of clock input signals associated with one or more of a plurality of clock select signals that indicates whether the associated clock input signal is selected;
a clock multiplexer circuit output for providing a clock signal output from said clock multiplexer circuit in response to said clock multiplexer circuit receiving said first clock input signal and a first clock select signal of the plurality of clock select signals configured to indicate a selection of the first clock input signal;
clock output level determining circuitry for determining a low phase output level in said clock signal output in response to a low phase input level in said first clock input signal;
locking circuitry for locking said clock multiplexer circuit to maintain said low phase output level irrespective of the phase level of said first clock input signal, wherein the locking circuitry locks said clock multiplexer circuit by locking a set of internal request lines of said clock multiplexer circuit in response to the first clock select signal of the plurality of clock select signals being configured not to indicate a selection of the associated clock input signal, wherein the set of internal request lines is used to facilitate transitions of the clock signal output from said clock multiplexer circuit between the plurality of clock input signals, and wherein said clock multiplexer circuit maintains said low phase output level at least so long as the set of internal request lines remain locked;
clock multiplexer input circuitry for receiving a second clock input signal of the plurality of clock input signals in said clock multiplexer circuit;
low phase input level determining circuitry for determining the presence of a low phase input level in said second clock input signal;
switching circuitry for switching, if a second clock select signal of the plurality of clock select signals is configured to indicate a selection of the second clock input signal, from providing said clock signal output based on the locked low phase output level to providing said clock signal output in response to said second clock input signal while maintaining said low phase output level and while said low phase input level is present in said second clock input signal, wherein the switching performed by the switching circuitry includes unlocking the set of internal request lines; and
clock multiplexer circuit output circuitry for allowing said output of said clock multiplexer circuit to follow the phase level of said second clock signal input after said switching circuitry switches from said first clock input signal to said second clock input signal.

11. The glitch reducing clock switching circuit of claim 10, further comprising circuitry and instructions for performing an early stage locking step and a later stage locking step.

12. The glitch reducing clock switching circuit of claim 10, further comprising circuitry and instructions for testing the operation of said clock multiplexer circuit using circuitry at least of portion of which operates independently of said first clock signal input and said second clock signal input.

13. The glitch reducing clock switching circuit of claim 10, further comprising circuitry and instructions for associating said first clock signal input with said clock multiplexer circuit using a first clock control pipeline and said second clock signal input with said clock multiplexer circuit using a second clock control pipeline.

14. The glitch reducing clock switching circuit of claim 13, further comprising a decoder circuit for associating with said first clock control pipeline and said second clock control pipeline.

15. The glitch reducing clock switching circuit of claim 10, further comprising circuitry and instructions for deriving said first clock signal input from a first phase locked loop circuit and said second clock signal input from a second phase locked loop circuit.

16. The glitch reducing clock switching circuit of claim 10, further comprising circuitry and instructions for associating output of said clock multiplexer circuit with a plurality of digital signal processing circuits.

17. The glitch reducing clock switching circuit of claim 10, further comprising circuitry and instructions for associating said output of said clock multiplexer circuit with a mobile station modem chipset.

18. The circuit of claim 10, wherein internal request lines corresponding to external request values received at a decoder circuit are locked at least one clock cycle of the first or second clock input signals prior to a sampling event related to an output of the decoder circuit.

19. A mobile station modem, comprising:
receiving means for receiving a first clock input signal of a plurality of clock input signals in a clock multiplexer circuit, each of the plurality of clock input signals associated with one or more of a plurality of clock select signals that indicates whether the associated clock input signal is selected;
means for providing a clock signal output from said clock multiplexer circuit in response to said clock multiplexer circuit receiving said first clock input signal and a first clock select signal of the plurality of clock select signals configured to indicate a selection of the first clock input signal;
means for determining a low phase output level in said clock signal output in response to a low phase input level in said first clock input signal;
means for locking said clock multiplexer circuit to maintain said low phase output level irrespective of the phase level of said first clock input signal, wherein the means for locking locks said clock multiplexer circuit by locking a set of internal request lines of said clock multiplexer circuit in response to the first clock select signal of the plurality of clock select signals being configured not to indicate a selection of the associated clock input signal, wherein the set of internal request lines is used to facilitate transitions of the clock signal output from said clock multiplexer circuit between the plurality of clock input signals, and wherein said clock multiplexer circuit maintains said low phase output level at least so long as the set of internal request lines remain locked;

means for receiving a second clock input signal of the plurality of clock input signals in said clock multiplexer circuit;

means for determining the presence of a low phase input level in said second clock input signal;

switching means for switching, if a second clock select signal of the plurality of clock select signals is configured to indicate a selection of the second clock input signal, from providing said clock signal output based on the locked low phase output level to providing said clock signal output in response to said second clock input signal while maintaining said low phase output level and while said low phase input level is present in said second clock input signal, wherein the switching performed by the switching means includes unlocking the set of internal request lines; and means for allowing said output of said clock multiplexer circuit to follow the phase level of said second clock signal input after operation of said switching means.

20. The mobile station modem of claim 19, further comprising means for performing said locking step as an early stage locking step for a first part of said locking step and a later stage locking step for a later part of said locking step.

21. The mobile station modem of claim 19, further comprising means for testing the operation of said clock multiplexer circuit using circuitry at least of portion of which operates independently of said first clock signal input and said second clock signal input.

22. The mobile station modem of claim 19, further comprising means for associating said first clock signal input with said clock multiplexer circuit using a first clock control pipeline and said second clock signal input with said clock multiplexer circuit using a second clock control pipeline.

23. The mobile station modem of claim 22, further comprising means for associating said decoder circuit with said first clock control pipeline and said second clock control pipeline.

24. The mobile station modem of claim 19, further comprising means for deriving a first clock signal input from a first phase locked loop circuit and said second clock signal input from a second phase locked loop circuit.

25. The mobile station modem of claim 19, further comprising means for associating output of said clock multiplexer circuit with a plurality of digital signal processing circuits.

26. The mobile station modem of claim 19, further comprising means for associating said output of said clock multiplexer circuit with a personal electronics device.

27. The mobile station modem of claim 19, wherein internal request lines corresponding to external request values received at a decoder circuit are locked at least one clock cycle of the first or second clock input signals prior to a sampling event related to an output of the decoder circuit.

* * * * *